(12) United States Patent
Tsukimori et al.

(10) Patent No.: US 8,200,873 B2
(45) Date of Patent: Jun. 12, 2012

(54) EDITING SYSTEM, COMPUTER, TIMING NOTICE APPARATUS, COMPUTER PROGRAM, AND METHOD FOR ACQUIRING TIMING

(75) Inventors: Koji Tsukimori, Kanagawa (JP); Keiji Hirai, Kanagawa (JP)

(73) Assignee: Sony Corporation, Tokyo (JP)

(*) Notice: Subject to any disclaimer, the term of this patent is extended or adjusted under 35 U.S.C. 154(b) by 660 days.

(21) Appl. No.: 10/799,617

(22) Filed: Mar. 15, 2004

(65) Prior Publication Data
US 2004/0199708 A1 Oct. 7, 2004

(30) Foreign Application Priority Data
Apr. 4, 2003 (JP) ................ P2003-102165

(51) Int. Cl.
*G06F 13/36* (2006.01)
*G06F 13/362* (2006.01)
*G06F 1/04* (2006.01)
*G06F 1/12* (2006.01)
*G06F 15/16* (2006.01)
*G06F 13/42* (2006.01)
*H04L 5/00* (2006.01)
*H04L 7/00* (2006.01)

(52) U.S. Cl. .............. 710/117; 713/375; 713/400

(58) Field of Classification Search ........... 710/117, 710/313, 58, 59, 61, 300, 305; 358/537; 399/182; 713/375, 400, 500–503, 600; 702/89
See application file for complete search history.

(56) References Cited

U.S. PATENT DOCUMENTS 3,684,826 A * 8/1972 Hurst .............. 360/70
4,802,746 A * 2/1989 Baba et al. ............ 359/667
4,862,451 A * 8/1989 Closs et al. ............ 370/353
4,905,095 A * 2/1990 Yamada ................ 358/451

(Continued)

FOREIGN PATENT DOCUMENTS
EP 969660 A2 * 1/2000
(Continued)

OTHER PUBLICATIONS

"NN82113081: Apparatus for Generating Timing Signal for a Belt Type Copier", Nov. 1, 1982, IBM, IBM Technical Disclosure Bulletin, vol. 25, Iss. 6, pp. 3081-3083.*

(Continued)

*Primary Examiner* — Faisal M Zaman
(74) *Attorney, Agent, or Firm* — Rader Fishman & Grauer, PLLC

(57) ABSTRACT

An editing system in which a personal computer is easily configured as an editing apparatus that performs editing processing in synchronization with predetermined timing. According to the invention, a personal computer 2 transmits an acquisition command C1 to a timing notice apparatus 4 over a USB cable 3, as a result, the personal computer 2 receives a timing notice signal S2 transmitted from the timing notice apparatus 4 under frame timing over the USB cable 3. Thus, it becomes possible to notify the personal computer 2 of the frame timing as reception timing of the timing notice signal S2 by connecting the timing notice apparatus 4 to the personal computer 2 over the USB cable 3 without the need of troublesome works such as installing a PCI board in a main body of the personal computer 2, thereby realizing an editing system 1 in which the personal computer 2 is easily configured as an editing apparatus that performs editing processing in synchronization with predetermined timing.

15 Claims, 5 Drawing Sheets

U.S. PATENT DOCUMENTS

| | | | |
|---|---|---|---|
| 4,981,066 A * | 1/1991 | Kakizaki | 84/613 |
| 5,072,319 A * | 12/1991 | Kohri et al. | 360/77.16 |
| 5,400,187 A * | 3/1995 | Van Gestel | 360/48 |
| 5,440,721 A * | 8/1995 | Morgan et al. | 713/502 |
| 5,490,209 A * | 2/1996 | Kennedy et al. | 379/93.08 |
| 5,675,813 A * | 10/1997 | Holmdahl | 713/310 |
| 5,680,596 A * | 10/1997 | Iizuka et al. | 713/600 |
| 5,689,313 A * | 11/1997 | Sotheran | 348/715 |
| 5,724,615 A * | 3/1998 | Ishii | 710/61 |
| 5,815,280 A * | 9/1998 | Ohmura et al. | 358/296 |
| 5,990,404 A * | 11/1999 | Miyano | 84/609 |
| 6,074,345 A * | 6/2000 | van Oostrom et al. | 600/300 |
| 6,118,769 A * | 9/2000 | Pries et al. | 370/324 |
| 6,137,944 A * | 10/2000 | Murakami | 386/232 |
| 6,166,766 A * | 12/2000 | Moore et al. | 348/241 |
| 6,188,791 B1 * | 2/2001 | Takizawa | 382/232 |
| 6,297,850 B1 * | 10/2001 | Han et al. | 348/521 |
| 6,366,610 B1 * | 4/2002 | Loyer et al. | 375/225 |
| 6,538,700 B1 * | 3/2003 | Ohta et al. | 348/513 |
| 6,628,417 B1 * | 9/2003 | Naito et al. | 358/1.15 |
| 6,675,215 B1 * | 1/2004 | Cedola | 709/227 |
| 6,708,234 B2 * | 3/2004 | Moteki et al. | 710/22 |
| 6,738,054 B1 * | 5/2004 | Yamaguchi | 345/204 |
| 6,741,290 B1 * | 5/2004 | Wells | 348/512 |
| 6,898,212 B1 * | 5/2005 | Chun et al. | 370/503 |
| 6,930,798 B1 * | 8/2005 | Kaneko | 358/1.9 |
| 6,956,600 B1 * | 10/2005 | Gaylord | 348/14.08 |
| 7,043,136 B2 * | 5/2006 | Kani et al. | 386/278 |
| 7,881,413 B2 * | 2/2011 | Nichols | 375/354 |
| 2002/0172111 A1 * | 11/2002 | Tsai et al. | 369/47.28 |
| 2003/0103763 A1 * | 6/2003 | Sugimura et al. | 386/65 |
| 2003/0225957 A1 * | 12/2003 | Hesse et al. | 710/313 |
| 2005/0041602 A1 * | 2/2005 | West et al. | 370/260 |

FOREIGN PATENT DOCUMENTS

| | | | |
|---|---|---|---|
| JP | 62222484 A * | | 9/1987 |
| JP | 63041869 A * | | 2/1988 |
| JP | 09289640 A * | | 11/1997 |
| JP | 2000-235542 | | 8/2000 |
| JP | 2003008845 A * | | 1/2003 |
| JP | 2004260541 A * | | 9/2004 |
| JP | 2005196105 A * | | 7/2005 |

OTHER PUBLICATIONS

Ono, K.; Owashi, H.; Otsubo, H.; Nishijima, H.; Sekiya, M.; Rokuda, M.; , "A field memory system for home-video editing," Consumer Electronics, IEEE Transactions on , vol. 35, No. 3, pp. 442-449, Aug. 1989.*

* cited by examiner

EDITING SYSTEM, COMPUTER, TIMING NOTICE APPARATUS, COMPUTER PROGRAM, AND METHOD FOR ACQUIRING TIMING

BACKGROUND OF THE INVENTION

1. Field of the Invention

The present invention relates to an editing system, and more particularly, to an editing system that uses, for example, a personal computer as an editing apparatus.

2. Description of the Related Art

In a conventional editing system, a personal computer is used as an editing apparatus, and images based on image data to be edited are deformed and composited to acquire desired edited images (for example, Japanese Patent Application No. 2000-235542, on page 2).

In the conventional editing system, in some cases, a personal computer is provided with a reference signal in which frame synchronization information is sequentially stored under timing indicative of temporal beginning of a temporally consecutive frame corresponding to a frame frequency of image data to be edited (referred to as frame timing, hereinafter) so as to edit the image data to be edited in synchronization with the frame timing generated by extracting the frame synchronization information from the reference signal.

However, in the editing system, in case of making a personal computer perform such editing processing, troublesome works such as installing a peripheral component interconnect (PCI) board for acquiring a reference signal in a main body of the personal computer are required, raising a problem that the personal computer is not easily configured as an editing apparatus that performs editing processing in synchronization with the frame timing.

SUMMARY OF THE INVENTION

In view of the foregoing, an object of this invention is to provide an editing system in which a computer is easily configured as an editing apparatus that performs editing processing in synchronization with predetermined timing.

The present invention provides an editing system having a computer and a timing notice apparatus connected to the computer over a universal serial bus (USB) cable. The computer comprises: a command transmission means for transmitting an acquisition command, which requires to acquire a timing notice signal for predetermined timing notice corresponding to a frame frequency of image data to be edited, to the timing notice apparatus over the USB cable; and a notice signal reception means for, as a result of the transmission of the acquisition command, receiving the timing notice signal transmitted from the timing notice apparatus over the USB cable under the predetermined timing. The timing notice apparatus comprises: a command reception means for receiving the acquisition command transmitted from the computer over the USB cable; and a notice signal transmission means for, when the acquisition command is received by the command reception means, transmitting the timing notice signal to the computer over the USB cable under the predetermined timing.

As a result, it is possible to easily notify the computer of the predetermined timing as reception timing of the timing notice signal by connecting the timing notice apparatus to the computer over the USB cable without the need of troublesome works such as installing a PCI board for acquiring a reference signal in a main body of the computer.

DESCRIPTION OF THE PREFERRED EMBODIMENTS

Figure 1:
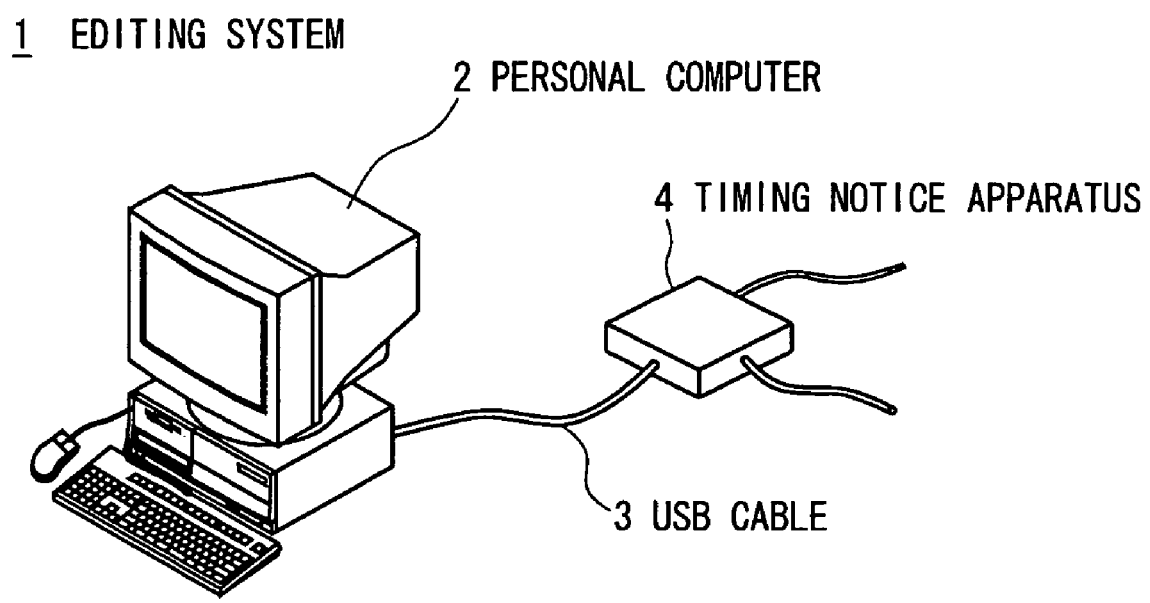
FIG. 1 shows a schematic view of an embodiment of an editing system according to the present invention.

Preferred embodiments of this invention will be described with reference to the accompanying drawings:

FIG. 1 shows a schematic view of an editing system 1 according to the present invention that has a personal computer 2 working as an editing apparatus and a timing notice apparatus 4 connected to the personal computer 2 over a universal serial bus (USB) cable 3.

Figure 2:
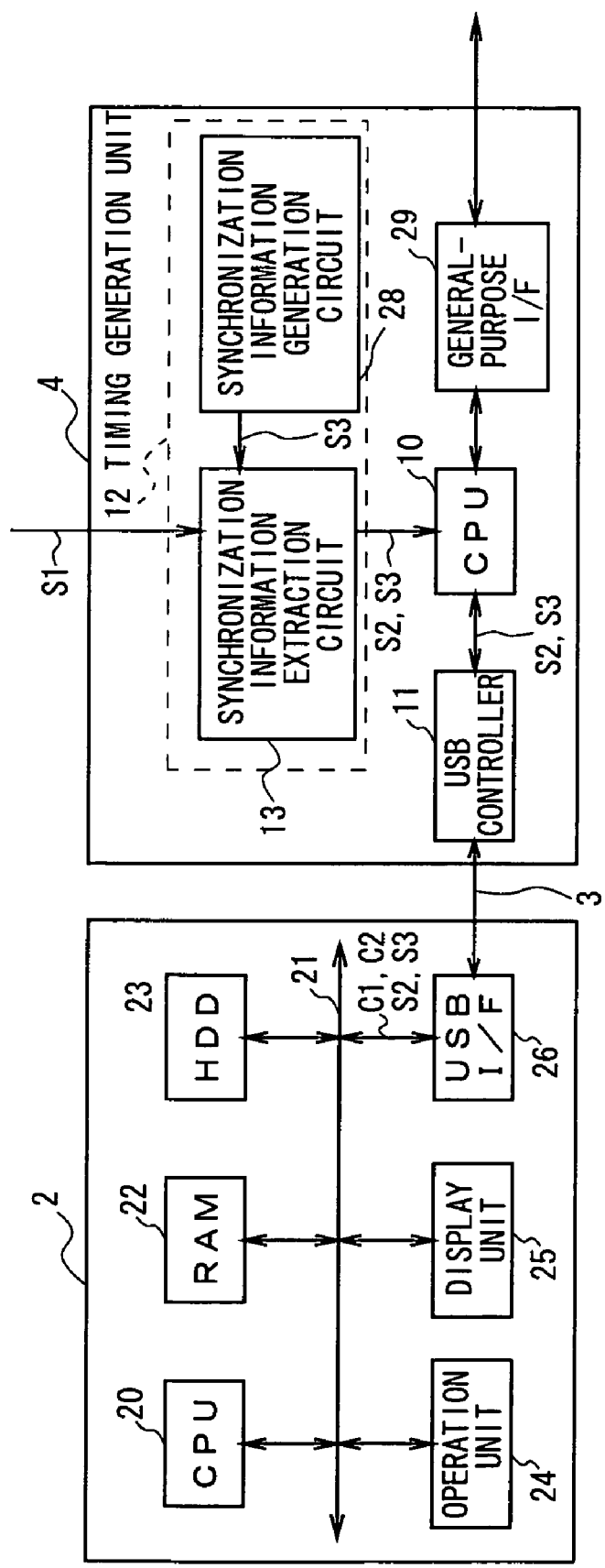
FIG. 2 shows a schematic circuit diagram of a personal computer and a timing notice apparatus.

As shown in FIG. 2, the timing notice apparatus 4 has a small-sized central processing unit (CPU) 10 of power-saving type that is supplied with operating power from the personal computer 2 over the USB cable 3 through a USB controller 11 to control respective units.

The timing notice apparatus 4 has a timing generation unit 12, in which a synchronization information extraction circuit 13 is arranged. The synchronization information extraction circuit 13 of the timing generation unit 12 receives a reference signal S1 provided from outside, and sequentially extracts frame synchronization information stored in the reference signal S1 under frame timing and concurrently sends the extracted frame synchronization information to the USB controller 11 through the CPU 10 as a timing notice signal S2 for the frame timing notice so as to input the timing notice signal S2 to an end point for USB interrupt transfer arranged in the USB controller 11.

When an acquisition command C1 requiring to acquire the timing notice signal S2 is transmitted from the personal computer 2 over the USB cable 3, the USB controller 11 transmits the timing notice signal S2, which is input to the end point under the frame timing that comes foremost after the reception of the acquisition command C1, to the personal computer 2 over the USB cable 3 at the same time when the timing notice signal S2 is input to the end point, that is, at the same time as the frame timing.

On the other hand, the personal computer 2 has a CPU 20, a random access memory (RAM) 22 used as working area of the CPU 20, a hard disc drive 23 that stores various programs such as an editing program in a hard disc, an operation unit 24, a display unit 25, and a USB interface unit 26, which are mutually connected by a bus 21. The USB interface unit 26 is connected to the USB cable 3.

In this case, the hard disc of the hard disc drive 23 has stored therein an application program, an application program interface that is lower than the application program and is composed of a main task and thread tasks, and a device driver that is lower than the application program interface.

The CPU 20 actually performs processing to acquire the timing notice signal S2 in accordance with the hierarchical application program, application program interface, and device driver (referred to as a timing acquisition program collectively, hereinafter). On the other hand, for convenience of explanation, these application program APP, application program interface API, and device driver DD are used in a functional block to explain the processing to acquire the timing notice signal S2, as shown in FIG. 3.

Figure 3:
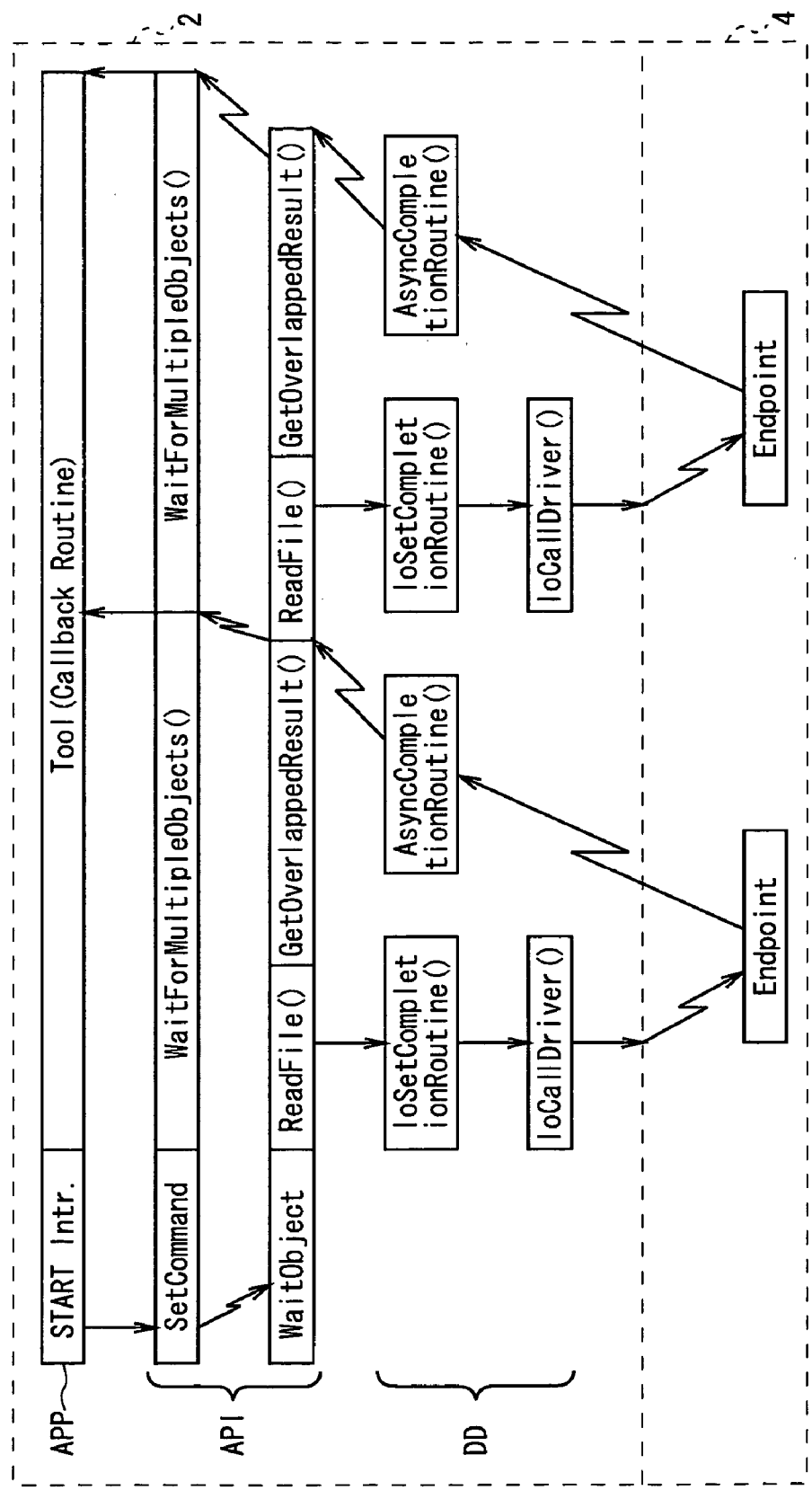
FIG. 3 shows a view to explain acquisition of a timing notice signal.

In FIG. 3, the application program APP starts the processing to acquire the timing notice signal S2 ("START Intr.") under timing when an editing start command is arbitrarily input through the operation unit 24 (that is, timing asynchronous against the frame timing).

Then, the application program interface API generates the acquisition command C1 ("Set Command"), and sends thus generated acquisition command C1 to the device driver DD ("Wait Object", "Read File ( )").

As a result, the device driver DD receives the acquisition command C1 sent from the application program interface API ("Io set Completion Routine ( )"), and transmits thus received acquisition command C1 from the USB interface unit 26 to the timing notice apparatus 4 over the USB cable 3 ("Io Call Driver ( )").

As a result of the transmission of the acquisition command C1 to the timing notice apparatus 4, the device driver DD waits to receive the timing notice signal S2 to be transmitted from the timing notice apparatus 4 over the USB cable 3 asynchronously ("Async Completion Routine ( )").

After receiving the acquisition command C1 transmitted from the personal computer 2 over the USB cable 3, under the control of the CPU 10, the USB controller 11 of the timing notice apparatus 4 transmits the timing notice signal S2, which is input to the end point under the frame timing that comes foremost after the reception of the acquisition command C1, to the personal computer 2 over the USB cable 3 at the same time when the timing notice signal S2 is input to the end point.

When the timing notice signal S2 transmitted from the timing notice apparatus 4 is received by the CPU 20 through the USB interface unit 26, the device driver DD notifies the application program interface API of this reception ("Async Completion Routine ( )").

At this time, the application program interface API waits for reception notice of the timing notice signal S2 ("Get Overlapped Result ( )", "Wait For Multiple Objects ( )"), and when notified of this reception of the timing notice signal S2, the application program interface API notifies the application program APP of this reception ("Callback Routine"), and resends the acquisition command C1 to the device driver DD ("Read File ( )").

As a result, the device driver DD receives the acquisition command C1 sent from the application program interface API ("Io set Completion Routine ( )"), and resends thus received acquisition command Cl from the USB interface unit 26 to the timing notice apparatus 4 over the USB cable 3 ("Io Call Driver ( )").

In this way, until the application program APP ends the processing to acquire the timing notice signal S2 in accordance with an editing end command input through the operation unit 24, the application program interface API and device driver DD repeats transmission of the acquisition command C1 to the timing notice apparatus 4 and reception of the timing notice signal S2 transmitted from the timing notice apparatus 4.

Since signal transmission speed of the application program APP is comparatively high according to the USB standard, timing of reception notification of the timing notice signal S2 (that is, reception timing of the timing notice signal S2) is substantially concurrent with the frame timing when the timing notice signal S2 is transmitted from the timing notice apparatus 4. Thus, the reception timing is recognized to be the frame timing, and at the reception timing, editing processing being performed at this time is synchronized.

When starting the processing to acquire the timing notice signal S2, even if the application program interface API sends the acquisition command C1 to the device driver DD under arbitrary timing, after receiving the timing notice signal S2 once, the application program interface API sends the acquisition command C1 to the device driver DD under the timing of reception notification.

Accordingly, when starting the processing to acquire the timing notice signal S2, even if the device driver DD transmits the acquisition command C1 to the timing notice apparatus 4 asynchronously against the frame timing, after the timing notice signal S2 is received under the frame timing, the device driver DD transmits the acquisition command C1 to the timing notice apparatus 4 synchronously with the frame timing.

Since function of waiting to receive the timing notice signal S2 asynchronously "Async Completion Routine ( )" is set up, until the timing notice signal S2 is input to the end point of the USB controller 11 in the timing notice apparatus 4, the device driver DD does not have to send the acquisition command C1 to the timing notice apparatus 4 many times repeatedly. That is, once the acquisition command C1 is transmitted, the device driver DD can wait to receive the timing notice signal S2, thereby significantly reducing the burden of the processing to acquire the timing notice signal S2.

In this embodiment, when the CPU 10 of the timing notice apparatus 4 operates using operating power supplied from the personal computer 2 over the USB cable 3, the synchronization information extraction circuit 13 sequentially extracts frame synchronization information from the reference signal S1 to input the timing notice signal S2 to the end point of the USB controller 11, and transmits the timing notice signal S2 to the personal computer 2 only when receiving the acquisition command C1 transmitted from the personal computer 2 in this state.

Furthermore, the timing notice apparatus 4 has a synchronization information generation circuit 28 arranged therein, and in case the reference signal S1 is not provided from outside, the CPU 10 controls the synchronization information generation circuit 28 instead of the synchronization information extraction circuit 13.

In this case, the synchronization information generation circuit 28 sequentially generates synchronization information under the frame timing corresponding to a frame frequency in advance, and sends thus generated synchronization information to the USB controller 11 through the synchronization information extraction circuit 13 and the CPU 10 as a timing notice signal S3 for the frame timing notice to input the timing notice signal S3 to the end point.

In this state, when receiving the acquisition command C1 transmitted from the personal computer 2 over the USB cable 3, the USB controller 11 transmits the timing notice signal S3 to the personal computer 2 under the frame timing, which is similar to the above-described case explained referring to FIG. 3.

Thus, even though the reference signal S1 is not provided from outside, the timing notice apparatus 4 sequentially transmits the timing notice signal S3 to the personal computer 2 under the frame timing so that the frame timing is assumed to be the reception timing of the timing notice signal S3.

Furthermore, in the timing notice apparatus 4, the CPU 10 is connected to a general-purpose interface unit 29 to which external peripheral editing devices can be connected.

Thus, the CPU 10 transmits the timing notice signal S2 and timing notice signal S3 from the general-purpose interface unit 29 to the external peripheral editing devices under the frame timing, or relays various commands and information that are transmitted or received between the personal computer 2 and the external peripheral editing devices using the general-purpose interface unit 29.

In the above-described configuration, in the timing notice apparatus 4, the synchronization information extraction circuit 13 sequentially extracts frame synchronization information from the reference signal S1 under the frame timing and concurrently inputs thus extracted frame synchronization information to the end point of the USB controller 11 as the timing notice signal S2 so as to sequentially update the timing notice signal S2 that is input to the end point under the frame timing.

Figure 4:
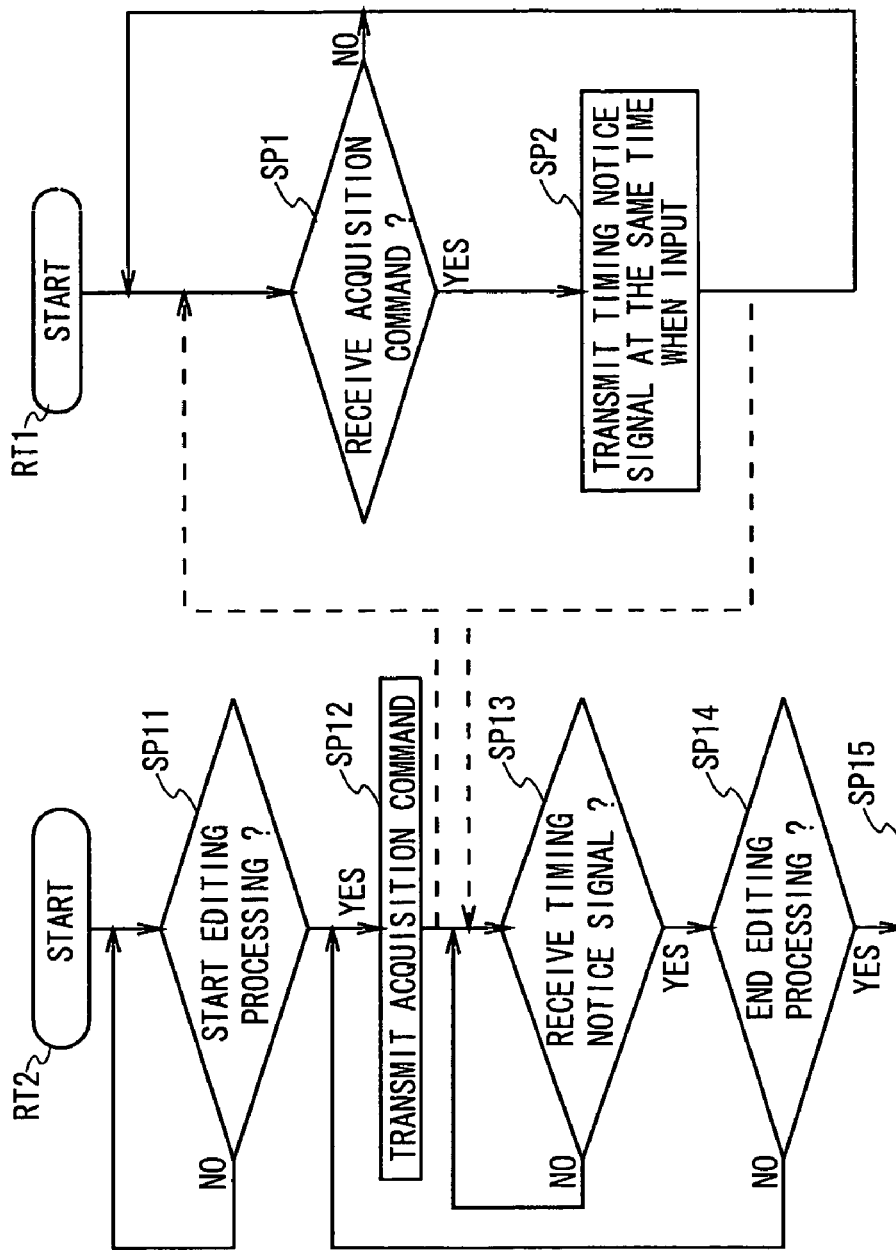
FIG. 4 consisting of FIGS. 4A and 4B shows a flow chart of the processing to acquire timing notice.

Next, the processing to acquire timing notice performed by the timing notice apparatus 4 and the personal computer 2 of the editing system will be explained. As shown in FIG. 4A, timing notice processing steps RT1 by the timing notice apparatus 4 is started. In step SP1, the USB controller 11 waits to receive the acquisition command C1 to be transmitted from the personal computer 2 over the USB cable 3.

On the other hand, as shown in FIG. 4B, timing acquisition processing steps RT2 by the personal computer 2 is started in accordance with the timing acquisition program. In step SP11, the CPU 20 waits for the start of editing processing.

In step SP11, when the CPU 20 starts editing processing in response to a command to start editing processing received through the operation unit 24, then in step SP12, the personal computer 2 transmits the acquisition command C1 to the timing notice apparatus 4 over the USB cable 3, going on to step SP13.

At this time, in step SP1, the USB controller 11 receives the acquisition command C1 transmitted from the personal computer 2 over the USB cable 3, going on to step SP2.

In step SP2, the USB controller 11 waits to receive the timing notice signal S2 from the synchronization information extraction circuit 13 through the CPU 10, and when the timing notice signal S2 is input, the USB controller 11 transmits the timing notice signal S2 to the personal computer 2 over the USB cable 3 at the same time when the timing notice signal S2 is input, that is, at the same time as the frame timing, going back to step SP1.

At this time, in step SP13, the CPU 20 waits to receive the timing notice signal S2 to be transmitted from the timing notice apparatus 4 over the USB cable 3, and when receiving the timing notice signal S2, going on to step SP14.

Then, in step SP14, the CPU 20 judges whether to end the editing processing or not, that is, in case a command to end the editing processing has not been received through the operation unit 24, the CPU 20 determines not to end the editing processing, going back to step SP12.

In this way, by circularly repeating the processing of step SP14-SP12-SP13-SP14 until a command to end the editing processing is received in step SP14, the CPU 20 sequentially receives the timing notice signal S2 at the same time as the frame timing and performs editing processing in synchronization with the reception timing (that is, the frame timing).

When a command to end the editing processing is received through the operation unit 24 in step SP14, the CPU 20 ends the editing processing in response to the command, going on to step SP15 to end the timing acquisition processing steps RT2. Thus, the editing system 1 ends the entire processing to acquire timing notice performed by the timing notice apparatus 4 and the personal computer 2.

Accordingly, in the editing system 1, in case the personal computer 2 transmits the acquisition command C1 to the timing notice apparatus 4, by transmitting the timing notice signal S2 from the timing notice apparatus 4 to the personal computer 2 under the frame timing generated by extracting the frame synchronization information from the reference signal S1, the personal computer 2 can be notified of the frame timing as the reception timing of the timing notice signal S2, thereby enabling the personal computer 2 to perform editing processing in synchronization with the frame timing.

In the editing system 1, since the personal computer 2 and the timing notice apparatus 4 are connected over the USB cable 3, troublesome works such as installing a PCI board for acquiring the reference signal S1 in a main body of the personal computer 2 are not required, realizing the state in which the frame timing can be easily notified.

In the above-described configuration in which the timing notice apparatus 4 is connected to the personal computer 2 over the USB cable 3, when the timing notice apparatus 4 receives the acquisition command C1 transmitted from the personal computer 2, the timing notice apparatus 4 transmits the timing notice signal S2 to the personal computer 2 under the frame timing generated by extracting the frame synchronization information from the reference signal S1. Thus, the personal computer 2 can be in the state of being easily notified of the frame timing, and can be surely notified of the frame timing as the reception timing of the timing notice signal S2. So, an editing system in which the personal computer 2 is easily configured as an editing apparatus that performs editing processing in synchronization with the frame timing can be realized.

Furthermore, after transmitting the acquisition command C1 to the timing notice apparatus 4, the personal computer 2 waits to receive the timing notice signal S2 to be transmitted from the timing notice apparatus 4. Thus, during the period from when the acquisition of the timing notice signal S2 is required and until the timing notice signal S2 is actually received, the personal computer 2 does not have to transmit the acquisition command C1 many times, thereby significantly reducing the burden of the processing to acquire the timing notice signal S2.

Furthermore, since the timing notice apparatus 4 operates using operating power supplied from the personal computer 2 over the USB cable 3, the editing system 1 can be easily configured so long as commercial power or the like is securely supplied to the personal computer 2.

Recently, the USB interface unit 26 is generalized as an interface unit of the personal computer 2, and almost every personal computer 2 has the USB interface unit 26 arranged therein.

So, in the editing system 1, the timing notice apparatus 4 can be connected to a general-purpose personal computer over the USB cable 3.

The editing system 1 can use a general-purpose personal computer as an editing apparatus easily by disclosing the application program interface API stored in a hard disc of the personal computer 2, and only recording the "Callback Routine" function of the application program APP, explained referring to FIG. 3, in an application program stored in a hard disc of the general-purpose personal computer.

Figure 5:
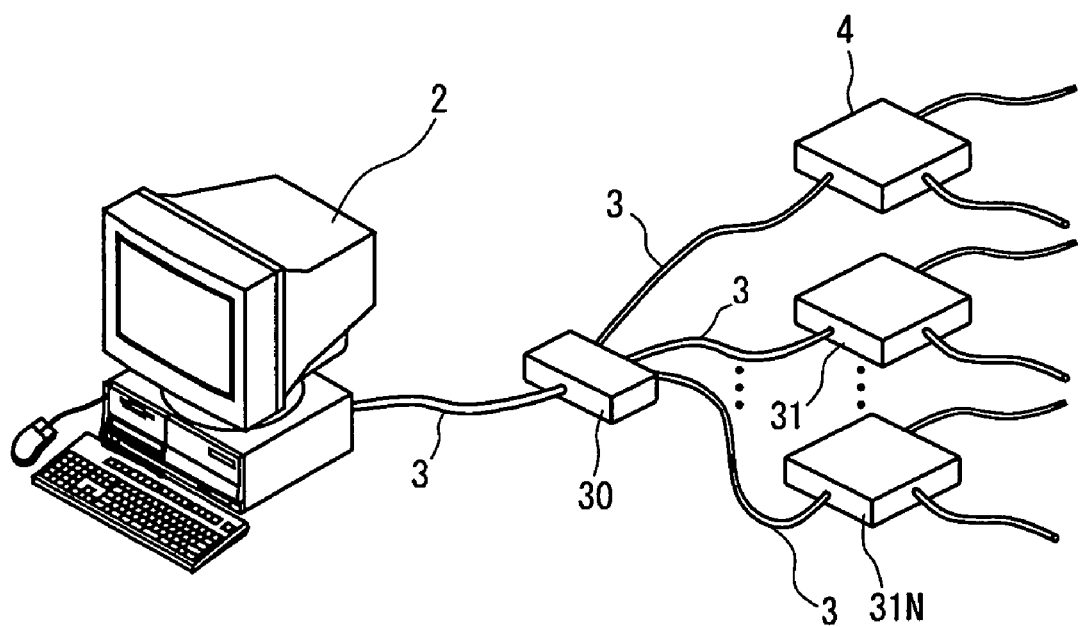
FIG. 5 shows a schematic view of another embodiment of an editing system according to the present invention.

In the above-described embodiment, one timing notice apparatus 4 is connected to the personal computer 2 over the USB cable 3, on the other hand, the present invention in not restricted to the case. For example, a plurality of timing notice apparatuses 4, 31, . . . , 31N that extract frame synchronization information from reference signals having the frame synchronization information stored therein under the frame timing in accordance with different frame frequencies (59.94 Hz, 50 Hz, 24 Hz, etc.) may be connected to the personal computer 2 over the USB cables 3 though a hub 30 for the USB, as shown in FIG. 5.

When the plural timing notice apparatuses 4, 31, . . . , 31N are connected to the personal computer 2, the timing notice apparatuses 4, 31, . . . , 31N can be switched easily by selecting a timing notice apparatus for use to which the acquisition command C1 is transmitted from the personal computer 2 under the control of software.

Also, in the above-described embodiment, the timing notice signal S2 or S3 is transmitted from the timing notice apparatus 4 to the personal computer 2 over the USB cable 3 under the frame timing, on the other hand, the present invention in not restricted to the case. For example, under timing indicative of temporal beginnings of first and second fields corresponding to a frame frequency of image data to be edited (referred to as field timing, hereinafter), a timing notice signal for the field timing notice may be transmitted from the timing notice apparatus 4 to the personal computer 2 over the USB cable 3.

Furthermore, in the above-described embodiment, the timing acquisition program of the present invention is applied to a timing acquisition program stored in a hard disc of the personal computer 2 in advance, and the above-described timing acquisition processing steps RT2 is performed in accordance with the timing acquisition program referring to FIG. 4B, on the other hand, the present invention in not restricted to the case. For example, a timing acquisition program may be installed to the personal computer 2 using wire or wireless communication media such as the local area network, Internet, Digital Satellite Broadcasting and the like to perform the timing acquisition processing steps RT2, or a program storage medium having the timing acquisition program stored therein may be installed to the personal computer 2 to perform the timing acquisition processing steps RT2.

As a program storage medium having stored therein the timing acquisition program to perform the timing acquisition processing steps RT2, which can be installed to the personal computer 2 to realize the processing, there are package media such as a flexible disc, compact disc-read only memory (CD-ROM), digital versatile disc (DVD), moreover, a semiconductor memory, magnetic disc that can store the timing acquisition program temporarily or perpetually. Furthermore, when storing the timing acquisition program to the program storage medium, wire or wireless communication media such as the local area network, the Internet, Digital Satellite Broadcasting and the like may be used, or various communication interfaces such as a router and a modem may be used.

Furthermore, in the above-described embodiment, the present invention is applied to the editing system 1 shown in FIG. 1 to FIG. 5, on the other hand, the present invention in not restricted to the case. For example, the present invention can be applied to other various editing systems such as an editing system having a computer such as the personal computer 2 or a work station, and peripheral editing devices such as a video tape recorder in addition to the timing notice apparatus 4 are connected to the computer.

In an editing system using peripheral editing devices, when the reference signal S1 is provided to the timing notice apparatus 4 as well as peripheral editing devices, image data can be edited by synchronizing the personal computer as well as the peripheral editing devices with the frame timing.

Furthermore, in the above-described embodiment, in transmitting an acquisition command requiring to acquire a timing notice signal for predetermined timing notice corresponding to a frame frequency of image data to be edited to the timing notice apparatus over the USB cable, the CPU 20 and the USB interface unit 26 shown in FIG. 1 to FIG. 5 are employed as command transmission units, on the other hand, the present invention in not restricted to the case. For example, other various command transmission units may be employed such as a CPU and a USB interface unit that transmit an acquisition command requiring to acquire a timing notice signal for field timing notice corresponding to a frame frequency of image data to be edited to the timing notice apparatus over the USB cable.

Furthermore, in the above-described embodiment, as a result of the transmission of the acquisition command, in receiving a timing notice signal transmitted from the timing notice apparatus over the USB cable under predetermined timing, the CPU 20 and the USB interface unit 26 shown in FIG. 1 to FIG. 5 are employed as notice signal reception units, on the other hand, the present invention in not restricted to the case. For example, other various notice signal reception units may be employed such as a CPU and a USB interface unit that, as a result of the transmission of the acquisition command, receive a timing notice signal transmitted from the timing notice apparatus over the USB cable under field timing.

Furthermore, in the above-described embodiment, in receiving the acquisition command transmitted from the personal computer over the USB cable, the USB controller 11 shown in FIG. 1 to FIG. 5 is employed as a command reception unit, on the other hand, the present invention in not restricted to the case. For example, other various command reception units may be employed such as the CPU 10 and the USB controller 11.

Furthermore, in the above-described embodiment, after the acquisition command is received by the command reception unit, in transmitting a timing notice signal to the personal computer over the USB cable under predetermined timing, the USB controller 11 shown in FIG. 1 to FIG. 5 is employed as a notice signal transmission unit, on the other hand, the present invention in not restricted to the case. For example, other various notice signal transmission units may be employed such as the CPU 10 and the USB controller 11.

Furthermore, in the above-described embodiment, as a synchronization information extraction unit that, from a reference signal provided from outside in which synchronization information is sequentially stored under predetermined timing, sequentially extracts the synchronization information under the predetermined timing and concurrently sends thus extracted synchronization information to the notice signal transmission unit as the timing notice signal for the predetermined timing notice, the synchronization information extraction circuit 13 shown in FIG. 1 to FIG. 5 is employed, on the other hand, the present invention in not restricted to the case. For example, other various synchronization information extraction units may be employed such as a synchronization information extraction circuit that, from the reference signal S11 in which synchronization information is sequentially stored under field timing, sequentially extracts the synchronization information under the field timing and concurrently sends thus extracted synchronization information to the end point of the USB controller 11 as the timing notice signal for the field timing notice.

Furthermore, in the above-described embodiment, as a synchronization information generation unit that generates a timing notice signal for the predetermined timing notice under predetermined timing corresponding to a frame frequency of image data to be edited and concurrently sends thus generated timing notice signal to the notice signal transmission unit, the synchronization information generation circuit 28 shown in FIG. 1 to FIG. 5 is employed, on the other hand, the present invention in not restricted to the case. For example, other various notice signal generation units may be employed such as a notice signal generation circuit that sequentially generates a timing notice signal indicative of timing alone under frame timing or field timing corresponding to a frame frequency in advance and concurrently sends thus generated timing notice signal to the end point of the USB controller 11.

According to the present invention, since a computer transmits an acquisition command, which requires to acquire a timing notice signal for predetermined timing notice corresponding to a frame frequency of image data to be edited, to a timing notice apparatus over a USB cable, and receives the timing notice signal transmitted from the timing notice apparatus, which has received the acquisition command, over the USB cable under the predetermined timing, it is possible to easily notify the computer of the predetermined timing as reception timing of the timing notice signal by connecting the timing notice apparatus to the computer over the USB cable without the need of troublesome works such as installing a PCI board for acquiring a reference signal in a main body of the computer, thereby realizing an editing system in which the computer is easily configured as an editing apparatus that performs editing processing in synchronization with the predetermined timing.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An editing system comprising:
    a timing notice apparatus configured to output a timing notice signal and receive acquisition command transmissions, said timing notice apparatus outputting said timing notice signal after receiving one of the acquisition command transmissions;
    a computer configured to output said acquisition command transmissions and receive said timing notice signal, said computer awaiting a reception of said timing notice signal after outputting said one of the acquisition command transmissions,
    wherein a frequency rate for said timing notice signal is a frame frequency for a frame of image data, output of said acquisition command transmissions from said computer being synchronous with said frequency rate.

2. The editing system as set forth in claim 1, wherein output from said computer of a subsequent one of the acquisition command transmissions is permissible only after said reception of said timing notice signal.

3. The editing system as set forth in claim 2, wherein said timing notice signal is frame synchronization information when a reference signal is present, said timing notice signal being synthesized synchronization information when said reference signal is absent.

4. The editing system as set forth in claim 3, further comprising:
    a synchronization information extraction circuit configured to extract said frame synchronization information from within said reference signal, said frame frequency for the frame of image data being the frequency for said frame synchronization information.

5. The editing system as set forth in claim 3, further comprising:
    a synchronization information generation circuit configured to generate said synthesized synchronization information in the absence of said reference signal, said frame frequency for the frame of image data being the frequency for said synthesized synchronization information.

6. The editing system as set forth in claim 3, wherein a second timing notice signal is within a second reference signal, said second timing notice signal being extractable from within said second reference signal.

7. The editing system as set forth in claim 6, wherein a second timing notice apparatus is connectable to said computer, said second timing notice apparatus being configured to await receipt of said acquisition command transmissions and transmit a second timing notice signal.

8. The editing system as set forth in claim 7, wherein said second timing notice apparatus is connectable to said computer through a hub.

9. The editing system as set forth in claim 7, wherein said second timing notice signal is transmitted upon receipt of said acquisition command transmissions.

10. The editing system as set forth in claim 7, wherein frame frequencies of the image data and second data differ, said second timing notice signal being transmissible from said second timing notice apparatus at said frame frequency of the second data.

11. The editing system as set forth in claim 2, further comprising:
    a general-purpose interface configured to transfer said timing notice signal to an external peripheral editing device,
    wherein said general-purpose interface relays commands and information between said computer and said external peripheral editing device.

12. The editing system as set forth in claim 1, wherein said timing notice apparatus is configured to receive said acquisition command transmissions from a universal serial bus and output said timing notice signal onto said universal serial bus.

13. The editing system as set forth in claim 12, wherein said timing notice apparatus is configured to receive operating power from said universal serial bus.

14. A method for acquiring timing notice signals, the method comprising:
    transmitting an acquisition command from a computer, said computer awaiting a reception for one of the timing notice signals after transmitting said acquisition command;
    awaiting said acquisition command from said computer, said timing notice apparatus outputting said one of the timing notice signals only after receiving said acquisition command,
    wherein a rate of output for said timing notice signals is at a frame frequency for a frame of image data, said computer generating said acquisition commands at said rate.

15. The method as set forth in claim 14, wherein said timing notice apparatus extracts said timing notice signal from within said reference signal, said timing notice apparatus synthesizing said timing notice signal in the absence of said reference signal.

* * * * *